United States Patent [19]

Froelich

[11] Patent Number: 4,751,523

[45] Date of Patent: Jun. 14, 1988

[54] LASER SCANNER POWER COMPENSATION CIRCUIT

[75] Inventor: Ronald W. Froelich, Covina, Calif.

[73] Assignee: Xerox Corporation, Stamford, Conn.

[21] Appl. No.: 880,517

[22] Filed: Jun. 30, 1986

[51] Int. Cl.⁴ .............................................. G01D 9/42
[52] U.S. Cl. ................................... 346/108; 346/160; 358/296
[58] Field of Search ................. 346/108, 107 R, 76 L, 346/160; 358/296

[56] References Cited

U.S. PATENT DOCUMENTS 3,848,087 11/1974 Carrell .............................. 346/108

FOREIGN PATENT DOCUMENTS 60-120663 6/1985 Japan ................................... 346/108

Primary Examiner—E. A. Goldberg
Assistant Examiner—Mark Reinhart
Attorney, Agent, or Firm—Robert E. Cunha

[57] ABSTRACT

A circuit for correcting the write power of a laser raster output scanner as it scans across the write drum. During calibration, a piece of glass reflects part of the beam into a photo multiplier tube, the output of which is converted into a digital signal. This is compared to a reference signal. The difference for each segment of the scan is stored in RAM and also is converted back to an analog signal to modulate an acousto-optic modulator in the laser optics to correct the write power. After the system has settled to a point where the write power at the drum does not vary across the scan, the glass may be removed and the system operates using the corrections stored in RAM.

7 Claims, 8 Drawing Sheets

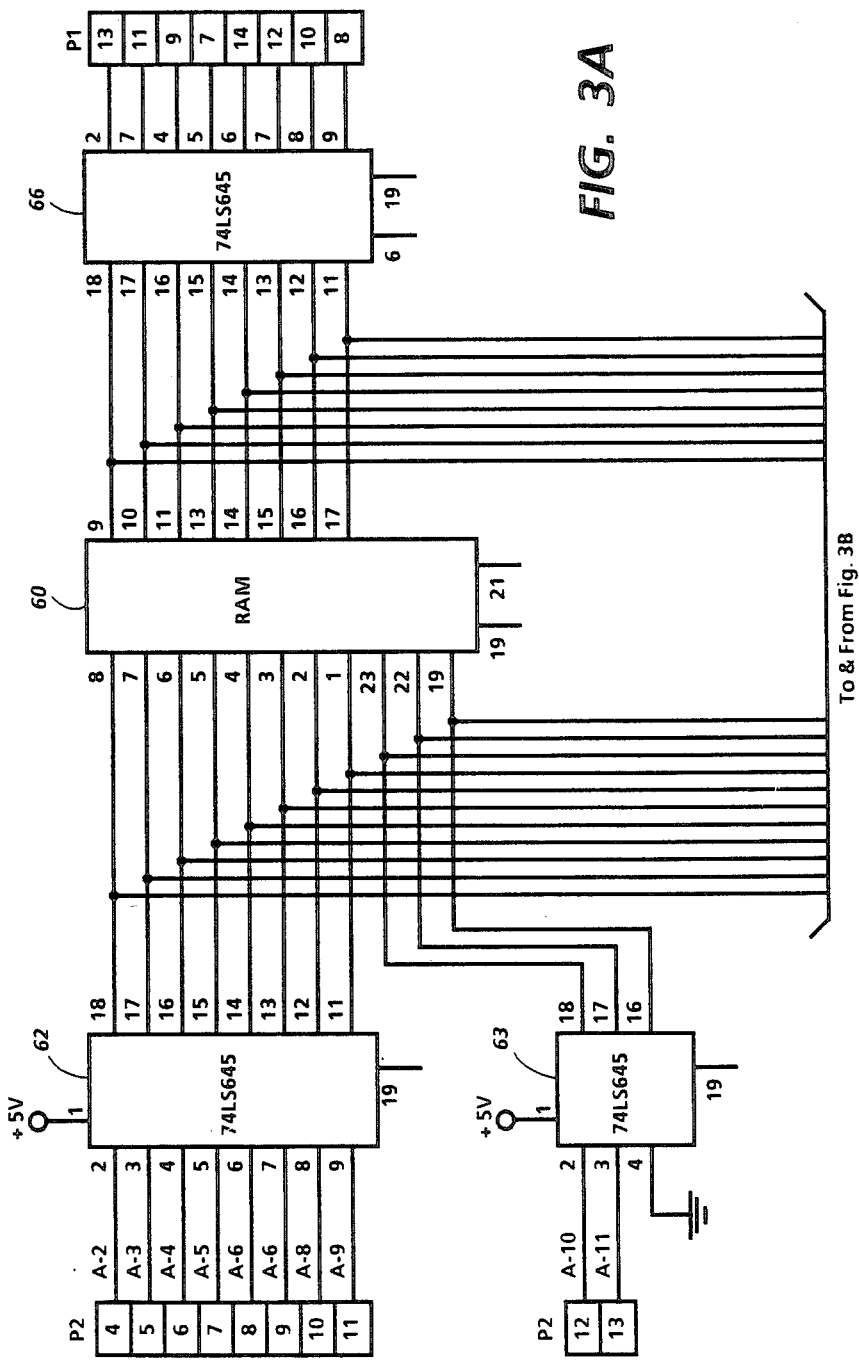

LASER SCANNER POWER COMPENSATION CIRCUIT

BACKGROUND OF THE INVENTION

This is a circuit for correcting for fluctuations in laser beam power as the raster output scanner travels from one end of its scan to the other and specifically comprises a memory for storing and compensating for variations for a plurality of segments of said scan.

Laser xerographic printing systems in color, high-performance service are very sensitive to the amount of laser drum illumination when printing halftoned images. The effect of too much illumination is to make the diameter of the halftoned dots oversized, resulting in color shades too light and mismatched with the original. Too little illumination causes unwanted background to be developed in the white areas. The causes for this problem are various.

Some examples are:

(1) Side-of-drum to side-of-drum and drum-to-drum xerographic sensitivity variations.

(2) Optical scanner side-to-side efficiency changes. The changes result from design, fabrication and alignment abnormalities as well as day-to-day minute variations believed caused by such things as thermal gradients, mechanical straining of the optical bed, vibration and noise from machine mechanisms, etc.

(3) Laser radiation power output level. The useful life of a laser tube is usually determined by the length of time that a laser can furnish sufficient output light. For example, a typical laser may typically start at output levels at 18 to 22 milliwatts and are usable down to about the 5 to 8 milliwatt level.

SUMMARY OF THE INVENTION

To permit the adjustment of the effective drum exposure level in small increments along the laser scan line, a drum exposure circuit can be installed. The circuit contains a small, dedicated microprocessor package which includes: an analog-to-digital video converter which can implement the direct reading of an illumination level falling at a position that represents the surface of the drum and a circuit which receives start-of-scan and end-of-scan signals as well as timing clock pulses.

To calibrate the system, either a single curved mirror or a series of small mirrors are used to collect a percentage of light from the laser scan line on to the surface of a light sensitive photomultiplier tube (PMT). This optical assembly may be either temporarily located in the write beam at a location that represents the drum surface or permanently located out of the normal beam path, so as not to interfere with the normal writing of the engine. A simple transmission dividing piece of glass could cause 1 or 2 percent of the total laser light power to fall on the PMT assembly. In actuality, this transmission divider mirror could be a piece of common uncoated plain window glass.

The PMT output represents the illumination level incident on the PMT surface that would be falling on the drum surface at any instant in time which the microprocessor can then translate to any position along the drum surface in distance. This analog signal is connected to the analog-to-digital converter of the microprocessor when calibration is desired. The microprocessor has a built-in standard curve stored in permanent read only memory (ROM). When a new drum is installed, the ROM curve can be loaded into RAM and a temporary correction curve applied to the system. By then using the PMT signal it is possible to generate the exact correction curve desired and then to more permanently upgrade the curve used by the micro using electrically alterable read only memory (EAROM). The EAROM saves the data so when power is turned off and back on the next day the previous curve is still available if it is to be used.

It is also an option to aim the light collection system at the printed copy as it exits the machine, and with appropriate color filters and by using three PMTs and a set of red, blue and green filters, to correct on the fly for total machine printing changes.

A corrective curve is stored in memory as an 8 bit wide word for every 1/40th of an inch along the length of the scan line on the drum. A memory address generator is started by the start-of-scan signal and driven by a clock signal which has a controlled number of pulse counts existing between start and end-of-scan signals. This address generator is configured and constructed to access the EAROM containing the memory curve during the scan line scan time by using DMA. The readout correction word from the memory is reconverted back to an analog siginal by a digital-to-analog (D/A) converter. It is this conversion signal that is used to modulate the transmission efficiency to the writer laser optical path for correction purposes.

In this system there are two locations where the transmission correction signal scan be applied to the optical system. However most laser printing systems are likely to have only one. The described system uses both an electro-optical (E/O) modulator and an acoustical-optical (A/O) modulator. The E/O unit is used for impressing either data or video intelligence on the writing optical laser beam while the A/O unit is used for facet tracking to conserve laser writing power. In this described system, the bandwidth capability of the E/O unit is totally employed passing the required high-speed modulation intelligence. Consequently, the transmission correction signal had to be applied to the A/O unit.

The normal modulation signal applied to any A/O modulator in facet tracking service consists of a frequency modulated (FM) ac sinwave carrier with a sweep frequency that might start at 25 Mhz. and change in a preselected way to some typical upper frequency of, for example, 160 Mhz. In facet tracking service, the frequency of the applied carrier determines the angle of the deflected beam and must not be varied by the DMA transmission correction signal. The DMA analog signal 15 is therefore applied to the A/O modulator package in such a manner so as to control the amplitude of the appied FM modulation signal to the A/O crystal head.

The techniques used to combine the AM signal on top of the FM signal must not produce sidebands that can upset the A/O crystal's ability to maintain the beam properly centered on the rotating and moving polygon facet. The FM signal must remain uninterrupted (CW), never being allowed to diminish to a zero level, while still being modulated either class A or class A-$B_1$. This includes the period of time between start-of-scan and end-of-scan during retrace.

To set up the transmission correction system, it is critical that the system be designed so that the DMA subsystem read the exact same word that corresponds to the same location along the scan line that the laser write system is scanning. By simultaneously applying the DMA memory saved correction word, reading the PMT output which measures actual transmission of the optical path, and comparing the difference, if any, to an internal reference, a dynamic correction signal can be generated, saved in EAROM on the fly and the system made to track small changes in the optical writing subsystem.

If the correction is to include the developed image, then it is necessary to use the upper or lower margin time on the copy when no intelligence is being impressed on the laser writing beam. If it is desired to include the development process and a replacable drum sensitivity, then the sampling must be taken on the finished copy after fusing, instead of ahead of the write drum just before the xerographic surface. However, in either case the laser scanning and pickup techniques used can easily be the same.

If an input PMT light measuring system is not present, then an option is to replace the input reading mechanism with data read from the printed copy using a MacBeth spectrophotometer and substituting read values along the scan line for PMT values.

BRIEF DESCRIPTION OF THE DRAWINGS

FIGS. 2(a), 2(b), 2(c), 3(a), 3(b), 3(c), and 4 are a schmatic diagram of the circuit.

DETAILED DESCRIPTION OF THE INVENTION

Figure 1:
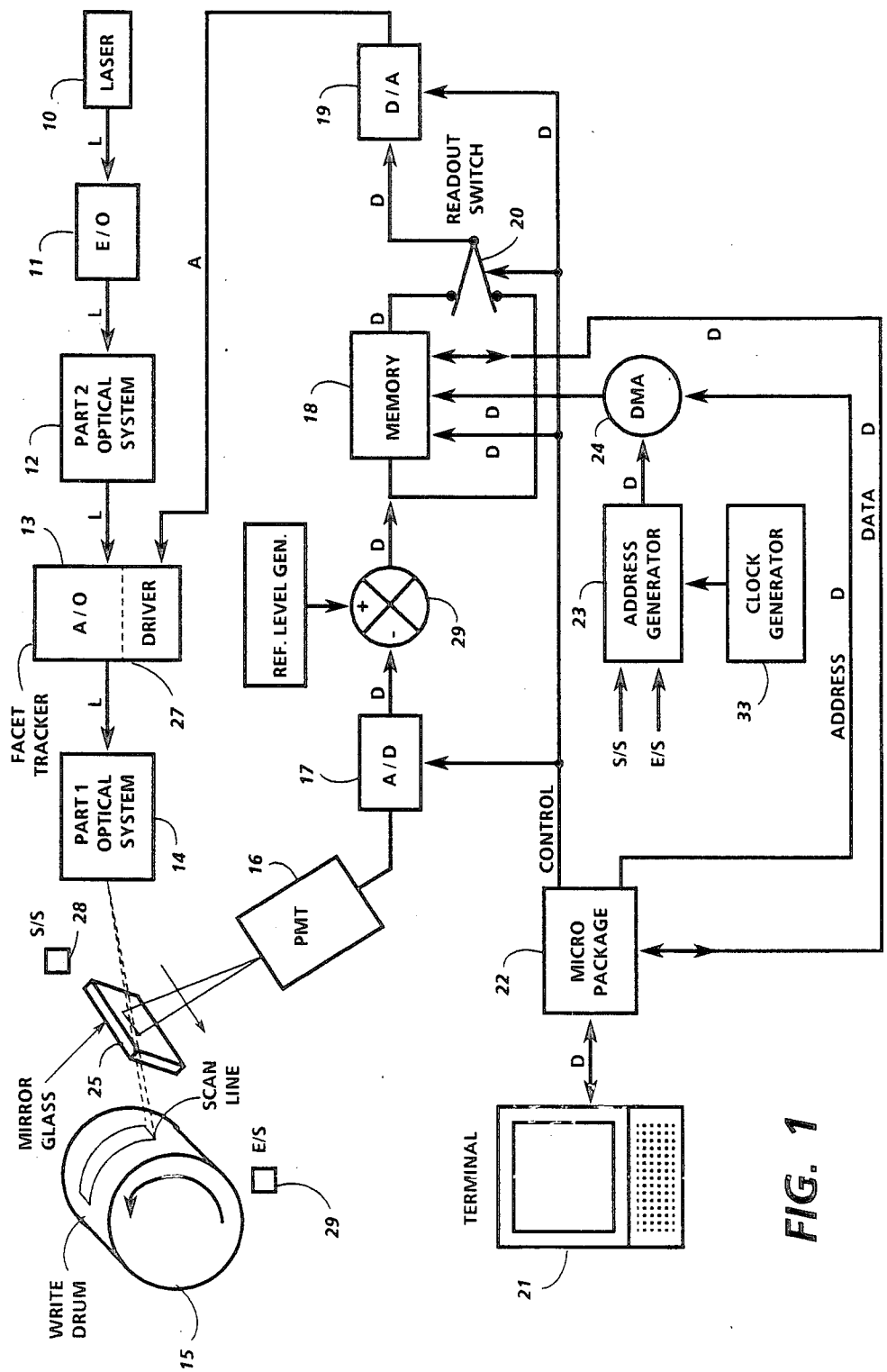
FIG. 1 is a block diagram of the system.

FIG. 1 is an overall block diagram of the system. The laser scan is originally generated by the laser 10 which is then modulated by the electro-optic modulator 11 to impart data onto the beam. After traveling through optics 12, the beam is made to track the current facet by acousto-optic modulator 13. The resultant beam is processed through additional optic elements 14, and is then used to illuminate the drum 15.

As the scan travels from one end of its scan to the other, it scans across the start-of-scan detector 28 and the end-of-scan detector 29. These are standard devices used in the industry to generate start and end signals. These signals are typically used to start and stop a counter which counts a data clock, so that data can be clocked out to the write electronics in synchronism with the scan. In this system, the data clock pulses generated by the the clock generator 33 are used to drive a counter address generator, which in turn clocks out the values stored in memory. Memory output is converted to an analog signal which is then used to AM modulate the FM signal applied to the modulator, thereby varying in a controlled manner the A/O modulator transmission.

A fraction of the light is reflected by partial mirror 25 into a photo-multiplier tube (PMT) 16, the analog output of which is converted into a digital signal by analog-to digital converter (A/D) 17. That digital signal is compared to a reference level at comparator 26, the difference being stored into the memory 18. At this point, switch 20 can be set in its "up" position up to read out the current value (in the calibrate mode, with the glass 25 in the beam path) or set to its "down" position to read out a stored value (in the operational mode with the glass 25 removed from the beam path). In the calibrate mode, the closed loop will result in the memroy finally containing a set of values which will result in a non-varying beam across the length of the drum. Then in the operational mode, these values are used for the actual write scanning. Finally, the memory output is converted into an analog signal at D/A 19 and is used as an input to driver 27 to amplitude modulate the beam to correct for all variations.

The address generator 23 is a counter which is driven by the system clock, turned on by the start-of-scan signal and terminated by the end-of scan signal. Data can also be entered into the memory 18 by means of a terminal 21 and a microcomputer package 22 which can load data into the memory 18 through DMA channel 24.

Figure 2A:
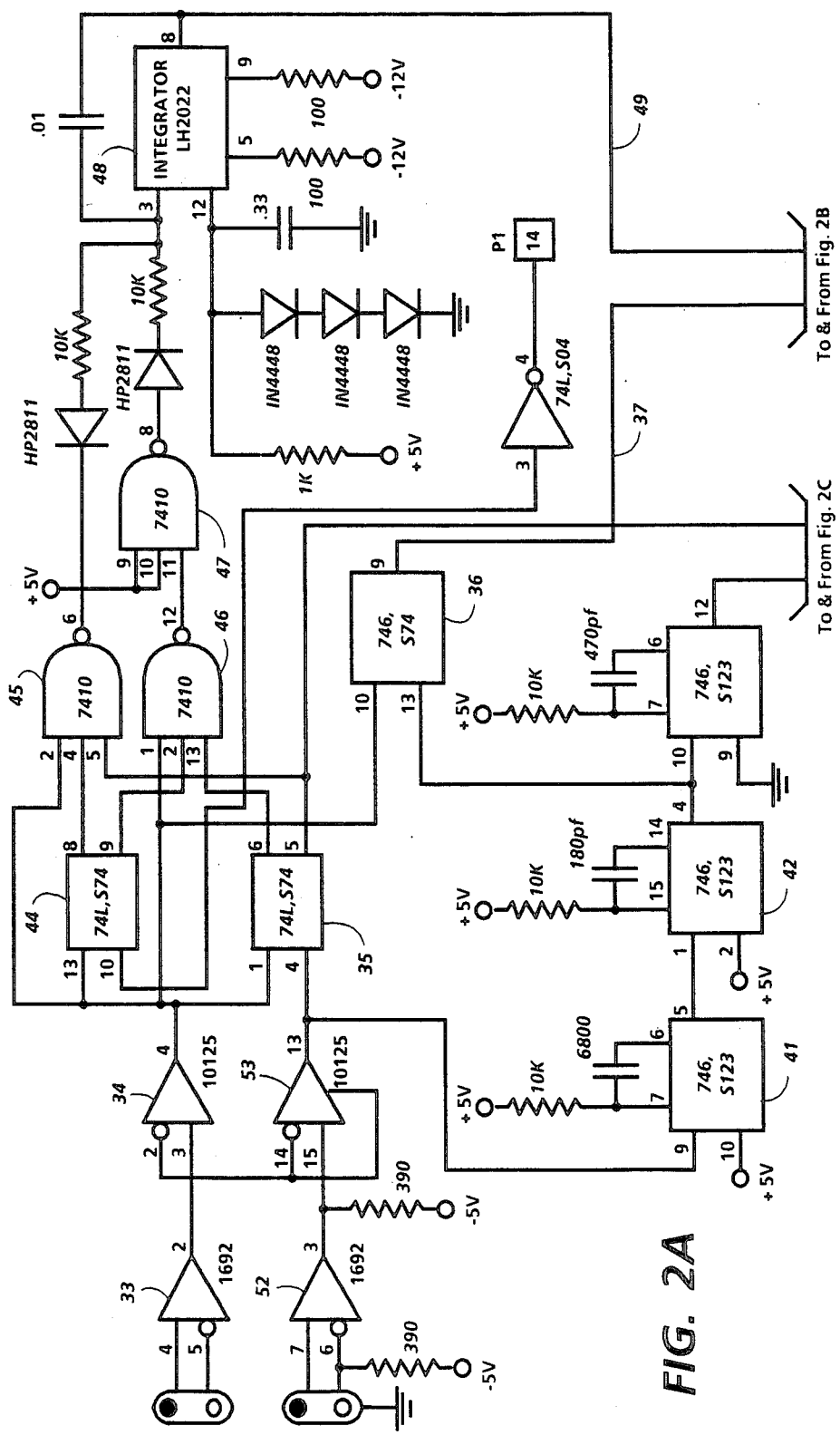
Figure 2B:
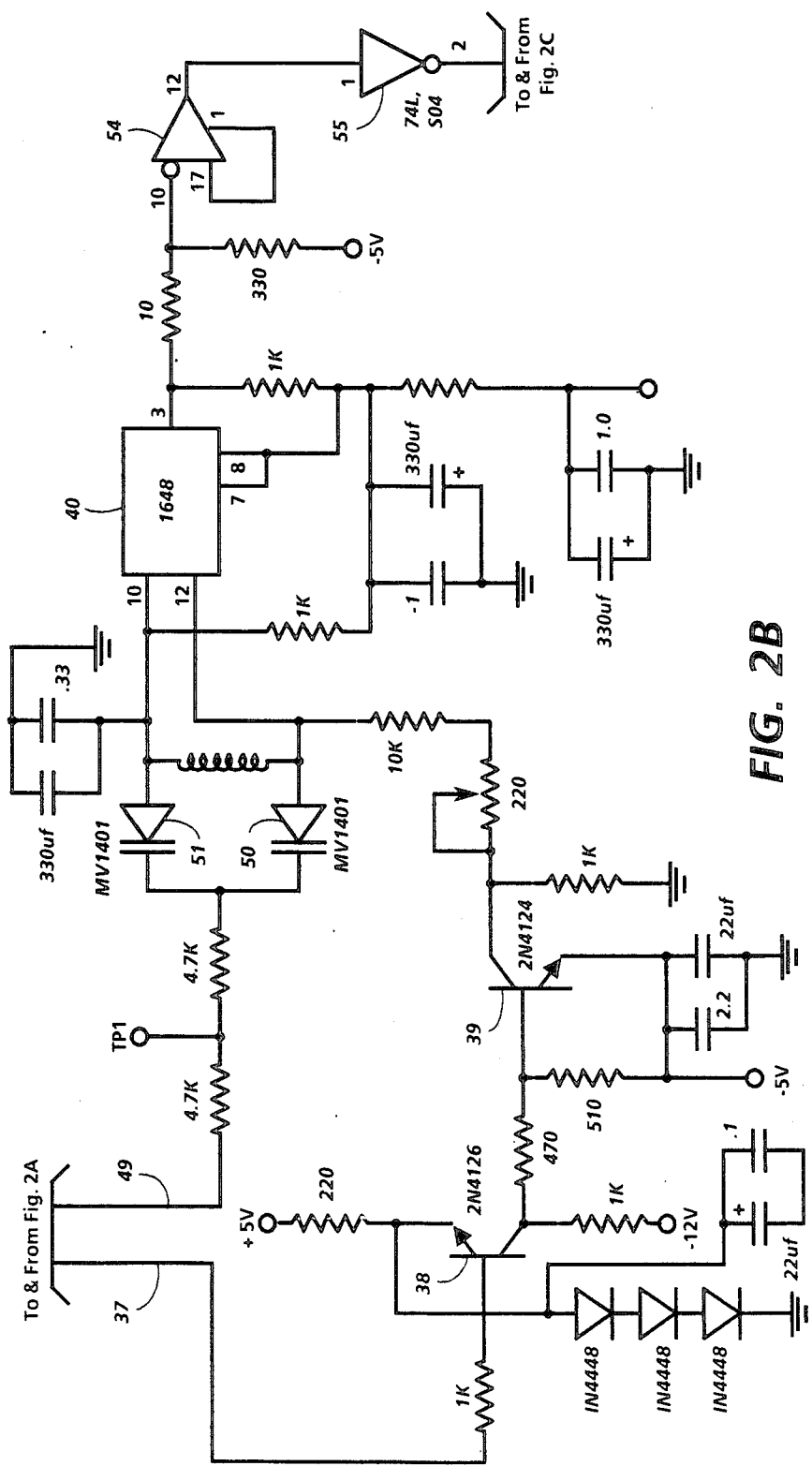
Figure 2C:
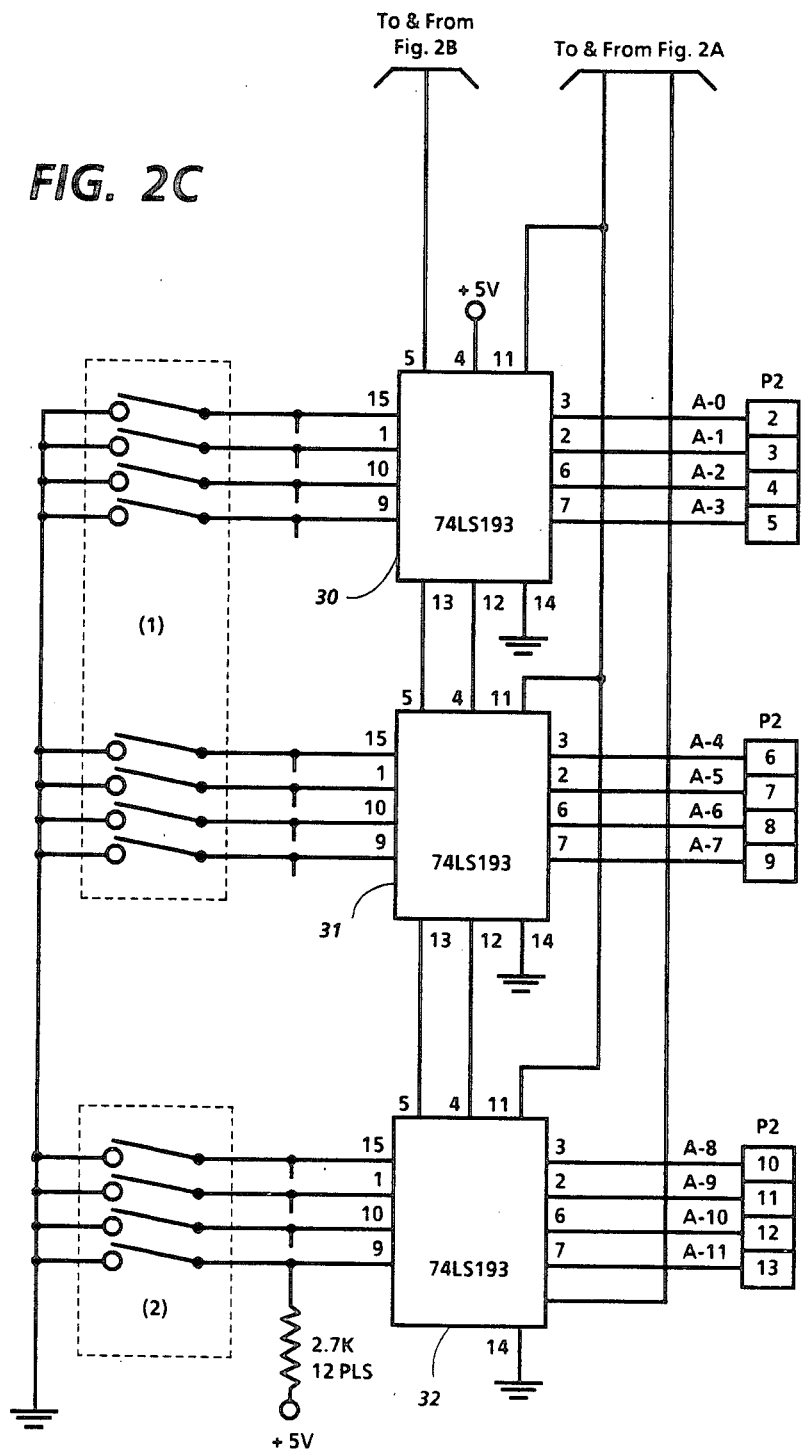

FIG. 2 is a detailed schematic diagram of the address generator. The main element is a twelve bit counter, implemented from three 4 bit parts 30, 31, 32, which is used to generate address signals A0 through A11. The counter is driven by oscillator 40 through buffers 54, 55. The counter is started at the beginning of the scan by the start of scan signal being coupled through line receivers 33 and 34, turning on flip flops 35 and 36, which applies an enabling voltage to line 37. Transistors 38 and 39 then generate a voltage which allows the oscillator 40 to begin generating pulses. At the end of scan, the end of scan signal from line receivers 52, 53 will turn off flip flop 35. Flip flop 36 will continue to stay on until a short time after the end of scan signal, which is coupled through line receivers 52, 53, since the end of scan signal is supplied to flip flop 36 through one shots 41, 42 which generates a slight delay. Therefore, the counter 30, 31, 32 will continue to count until an overflow is produced at line 43. This overflow is coupled to flip flop 44 which therefore will stay on from the start of scan to the overflow of the counter, an amount of time which is not the same as the total time from the start of scan to the end of scan. In other words, flip flop 35 turns off at the end of scan while flip flop 44 turns off at the end of the count, which may be earlier or later. The faster the counter is running, the sooner flip flop 44 will turn off, resulting in a difference signal which is either high or low depending on whether the counter is too fast or too slow. This difference signal is generated by gates 45, 46, 47 and used as an input to integrator 48, which will generate an analog signal which rises or falls as a function of the time difference, and is therefore an indication of whether the counter is running faster or slower than the polygon is rotating (the variation in rotation speed of the polygon resulting in more or less time between start and end of scan signals). Therefore, as the polygon varies in speed, the output of the integrator will also vary. This output signal at line 49 is applied to variable capacitors 50, 51 to vary the rate of oscillator 40. In this way the data rate, as determined by the oscillator, will track the polygon speed variations.

Figure 3B:
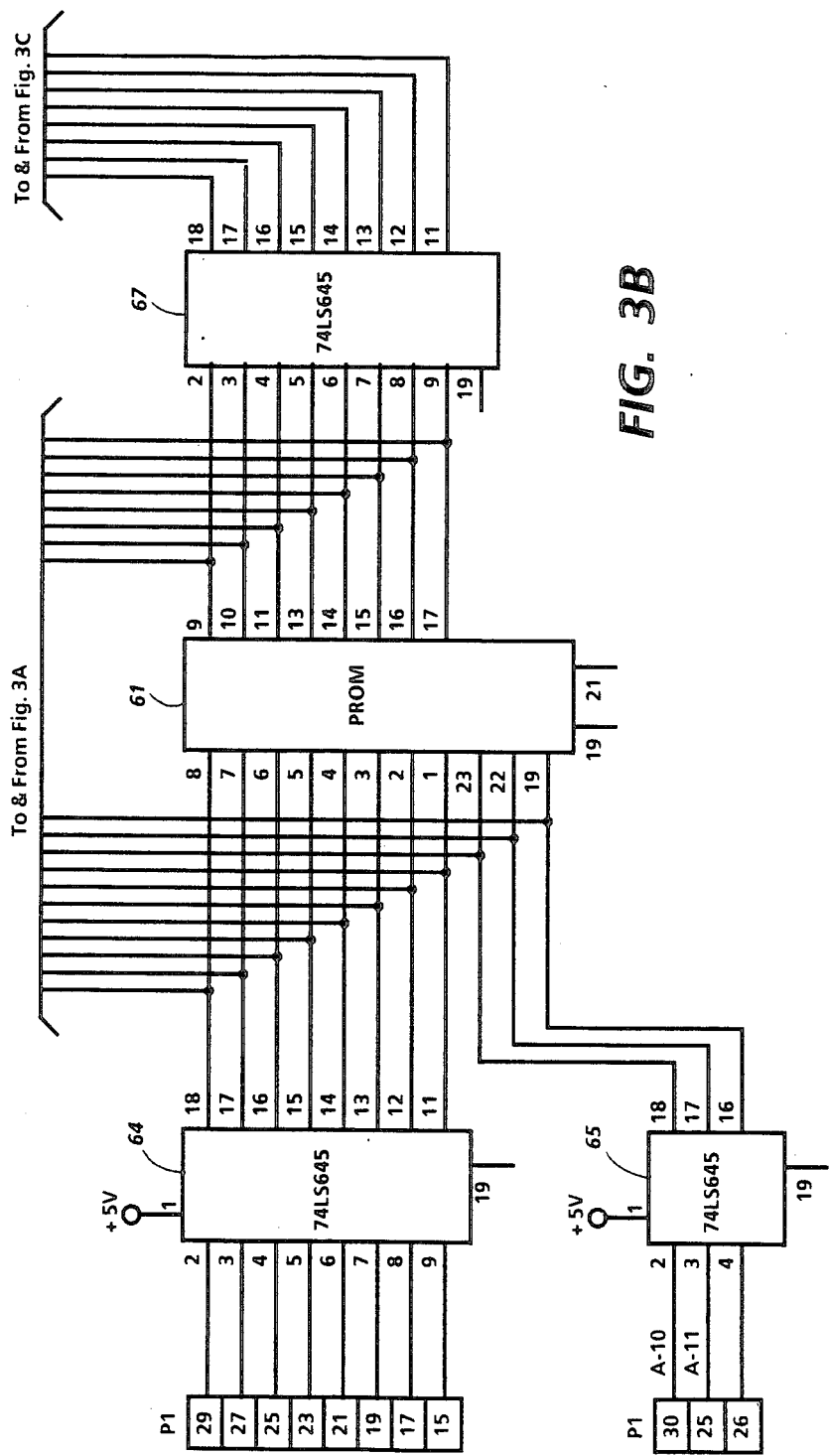
Figure 3C:
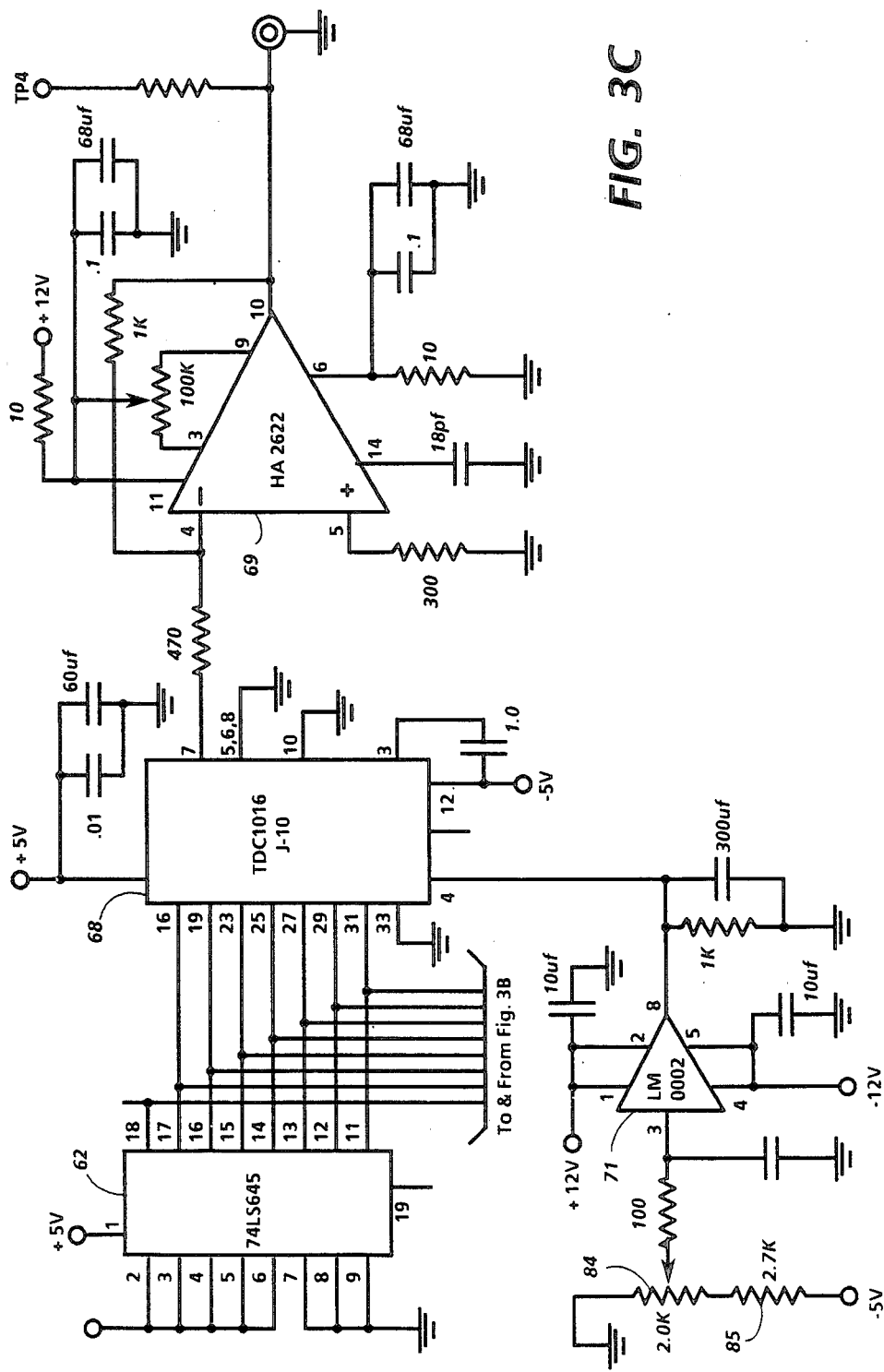

FIG. 3 is a schematic diagram of the memory comprising RAM 60 and PROM 61, addressed through buffers 62–65. Data is loaded into the memory through buffer 66. Data is taken out through buffer 67, which is enabled from start of scan to end of scan, and converted into a zero to one volt analog voltage in D/A converter 68 for input to amplifier 69, which, in turn, generates a zero to five volt signal to drive the acousto optical facet tracker. During fly back time (from end of scan to start of scan) a dummy input representing a constant gray value is generated at register 70 and applied to the amplifier 69 thru D/A converter 68 to maintain all operating voltages in the following circuits in their normal operating ranges. Unity gain amplifier 71 uses a voltage divider comprising resistors 84, 85 to generate the minus two volt reference voltage of a D/A converter.

In the calibrate mode, the data written is into memory 60, and the same word is immediately read out to the buffer 67. In the operate mode, no data is written in. The memory contents are sent out, as stored, to the buffer.

Figure 4:
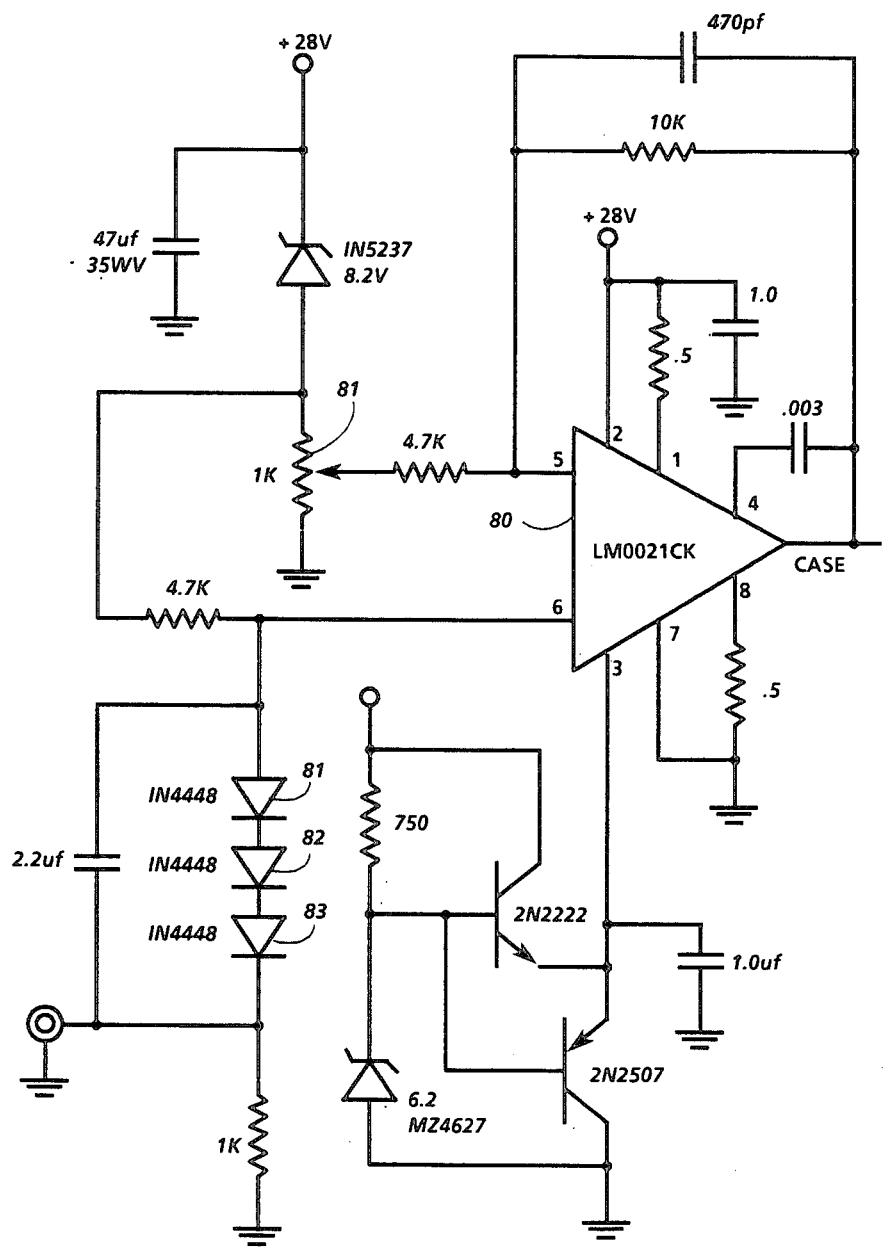

FIG. 4 is a schematic diagram of the modulator controller circuit, the main component of which is the acousto optic modulator driver 80. The zero to five volt output from amplifier 69 of FIG. 3 is shifted to a more positive voltage by zener diodes 81, 82, 83 to about positive 2 to 7 volts, and applied as the signal input to the driver 80 while a voltage divider reference is adjusted to plus 2 volts by potentiometer 81 is at the other input. The driver 80 amplifies the voltage, resulting in an output which varies from approximately 2 volts to 26 volts. Since this is a correction voltage to compensate for power variations, and since power typically falls off at the ends of the scan, the output will typically be higher at start and end of scan, and relatively lower during the middle of the scan. This signal results in a facet tracker output power that is correspondingly lower during the middle of the scan.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a raster output scanner comprising means for generating a laser beam, a write drum and an optical system for scanning said drum with said laser beam, a laser scanner output power regulating circuit comprising,
   a start of scan detector for generating a start of scan signal,
   an end of scan detector for generating an end of scan signal,
   a clock generator for generating clock pulses,
   a counter for counting said clock pulses, said counter using said start of scan signal to start counting and said end off scan signal to stop counting to produce a set of counts which correspond to scan positions across said drum,
   means located between the optical system and said drum for continuously reflecting a fraction of the beam that would otherwise fall on said drum,
   means for receiving said fraction of the beam from said means for reflecting and converting it into an electrical signal,
   means for generating a reference voltage,
   means for comparing said electrical signal to said reference voltage and for determining a difference,
   memory addressed by said set of counts for storing said difference for each scan position,
   means for enabling or disabling the loading of said memory with said difference so that the output of said memory is either the difference of the scan position for the current scan or for a previous scan, and
   means responsive to said difference output by said memory for controlling the amount of light allowed to pass from said means for generating to said means for reflecting.

2. The scanner of claim 1 wherein
   said reference voltage is a digital voltage,
   said said means for converting generates an analog electrical signal,
   said memory is a digital memory, and further comprising
   an analog to digital converter for converting the output of said means for converting to a digital signal, and
   a digital to analog converter for converting the output of said memory to an analog signal.

3. The scanner of claim 1 wherein said means for converting is a photo multiplier tube.

4. The scanner of claim 1 where said means for controlling comprises an acousto-optic modulator.

5. A system for regulating the intensity of a laser beam to a constant value as said beam scans a write drum from one side to the other comprising:
   an acousto-optic modulator positioned in the beam path,
   a partial mirror positioned between said modulator and said drum for continuously reflecting a portion of said beam,
   a photomultiplier tube for converting said reflected beam into an analog voltage,
   an analog to digital converter for converting said analog signal into a digital signal,
   a reference generator for generating a digital reference,
   a comparator for comparing said reference to said digital signal,
   a start of scan detector for generating a signal at the start of every scan,
   an end of scan detector for generating a signal at the end of every scan,
   a clock generator for generating clock pulses,
   an address generator which counts said clock pulses, is started by said start of scan signal and is stopped by said end of scan signal for generating an address,
   a memory responsive to said address for loading the output of said comparator into a memory location addressed by said address generator, and for outputting the contents of said memory addressed by said address generator,
   a digital to analog converter for converting the output of said memory into an analog signal,
   a driver responsive to said digital to analog output for supplying to said acousto-optic modulator a signal for varying the amount of the laser beam which is transmitted through said acousto-optic modulator, and
   means for disabling or enabling the writing of the output of said comparator into said memory so that the output of said memory will be either the output of said comparator for a previous scan or for the current scan.

6. The raster output scanner of claim 1 further comprising means for removing said means for reflecting from its position between said optical system and said drum when said loading of said memory is disabled.

7. The system of claim 5 further comprising means for removing said mirror from its position between said modulator and said drum when said writing into said memory is disabled.

* * * * *